United States Patent
Taylor et al.

(10) Patent No.: US 10,547,909 B2
(45) Date of Patent: *Jan. 28, 2020

(54) ELECTRONIC COMMERCE FUNCTIONALITY IN VIDEO OVERLAYS

(71) Applicant: Amazon Technologies, Inc., Seattle, WA (US)

(72) Inventors: Amber Autrey Taylor, Seattle, WA (US); Steven Kessel, Seattle, WA (US); Daniel Thomas Mellott, Seattle, WA (US); Brent Robert Mills, Seattle, WA (US); Liza Marie Walsh, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/004,693

(22) Filed: Jun. 11, 2018

(65) Prior Publication Data

US 2018/0295424 A1 Oct. 11, 2018

Related U.S. Application Data

(63) Continuation of application No. 14/751,823, filed on Jun. 26, 2015, now Pat. No. 10,021,458.

(51) Int. Cl.
*H04N 7/10* (2006.01)
*H04N 21/478* (2011.01)
(Continued)

(52) U.S. Cl.
CPC ... *H04N 21/47815* (2013.01); *G06Q 30/0633* (2013.01); *H04N 21/2187* (2013.01);
(Continued)

(58) Field of Classification Search
CPC ......... H04N 21/47815; H04N 21/2187; H04N 21/23439
(Continued)

(56) References Cited

U.S. PATENT DOCUMENTS 5,530,469 A 6/1996 Garfinkle
6,421,706 B1 7/2002 McNeill et al.
(Continued)

FOREIGN PATENT DOCUMENTS

WO 2014130594 8/2014

OTHER PUBLICATIONS

U.S. Appl. No. 14/751,816, filed Jun. 26, 2015, Final Office Action dated Aug. 28, 2018.
(Continued)

*Primary Examiner* — Jivka A Rabovianski
(74) *Attorney, Agent, or Firm* — Thomas | Horstemeyer, LLP

(57) ABSTRACT

Disclosed are various embodiments for providing interactive electronic commerce functionality via graphical overlays on live streaming video. An indication is received that an item is featured or discussed in a live video stream. The live video stream is sent to a client. Data encoding a selectable graphical overlay is sent to the client in response to the indication. The selectable graphical overlay is configured to be rendered by the client relative to the live video stream. A selection of the selectable graphical overlay is configured to perform an interactive function relative to the item.

20 Claims, 12 Drawing Sheets

(51) Int. Cl.
| | | |
|---|---|---|
| H04N 21/81 | (2011.01) | |
| H04N 21/2187 | (2011.01) | |
| H04N 21/431 | (2011.01) | |
| G06Q 30/06 | (2012.01) | |
| H04N 21/254 | (2011.01) | |
| H04N 21/234 | (2011.01) | |
| H04N 21/845 | (2011.01) | |
| H04N 21/2343 | (2011.01) | |
| H04N 21/235 | (2011.01) | |

(52) U.S. Cl.
CPC ... *H04N 21/2358* (2013.01); *H04N 21/23418* (2013.01); *H04N 21/23439* (2013.01); *H04N 21/2542* (2013.01); *H04N 21/4312* (2013.01); *H04N 21/812* (2013.01); *H04N 21/8456* (2013.01)

(58) Field of Classification Search
USPC .................................. 725/32, 51, 60, 61
See application file for complete search history.

(56) References Cited

U.S. PATENT DOCUMENTS

| | | |
|---|---|---|
| 6,754,904 B1 | 6/2004 | Cooper et al. |
| 6,904,408 B1 | 6/2005 | McCarthy et al. |
| 7,113,917 B2 | 9/2006 | Jacobi et al. |
| 7,143,428 B1 | 11/2006 | Bruck et al. |
| 7,584,435 B2 | 9/2009 | Bailey et al. |
| 7,603,683 B2 | 10/2009 | Reto |
| 7,962,935 B2 | 6/2011 | Kurosaki et al. |
| 8,013,938 B2 | 9/2011 | Shyu |
| 8,019,815 B2 | 9/2011 | Keener et al. |
| 8,266,014 B1 | 9/2012 | Bhosle et al. |
| 8,307,395 B2 | 11/2012 | Issa et al. |
| 8,312,500 B2 | 11/2012 | Emerson et al. |
| 8,327,395 B2 | 12/2012 | Lee et al. |
| 8,458,745 B2 | 6/2013 | Shanks et al. |
| 8,661,464 B2 | 2/2014 | Arankalle et al. |
| 8,745,661 B2 | 6/2014 | Ellis et al. |
| 8,826,350 B1 | 9/2014 | Maeng |
| 8,898,316 B2 | 11/2014 | Facemire et al. |
| 8,918,330 B1 | 12/2014 | Winkler et al. |
| 8,935,713 B1 | 1/2015 | Gabel et al. |
| 9,009,794 B2 | 4/2015 | Dykeman et al. |
| 9,031,382 B1 | 5/2015 | Kaiser et al. |
| 9,055,312 B2 | 6/2015 | Civanlar et al. |
| 9,571,900 B2 | 2/2017 | Slothouber et al. |
| 9,621,613 B1 | 4/2017 | Huang et al. |
| 9,710,970 B2 | 7/2017 | Jung et al. |
| 9,883,249 B2 | 1/2018 | Taylor et al. |
| 9,973,819 B1 | 5/2018 | Taylor et al. |
| 2001/0044751 A1 | 11/2001 | Pugliese et al. |
| 2002/0056087 A1 | 5/2002 | Berezowski et al. |
| 2002/0112239 A1 | 8/2002 | Goldman |
| 2003/0028873 A1 | 2/2003 | Lemmons |
| 2003/0056219 A1 | 3/2003 | Reichardt et al. |
| 2003/0066074 A1 | 4/2003 | Zimmerman et al. |
| 2004/0098754 A1 | 5/2004 | Vella et al. |
| 2005/0132420 A1 | 6/2005 | Howard et al. |
| 2005/0149964 A1 | 7/2005 | Thomas et al. |
| 2005/0149987 A1 | 7/2005 | Boccon-Gibod et al. |
| 2005/0262542 A1 | 11/2005 | Deweese et al. |
| 2006/0015409 A1 | 1/2006 | Kato et al. |
| 2006/0129458 A1 | 6/2006 | Maggio |
| 2006/0130109 A1 | 6/2006 | Zenith |
| 2006/0179454 A1 | 8/2006 | Shusman |
| 2006/0184624 A1 | 8/2006 | Thukral |
| 2006/0230123 A1 | 10/2006 | Simmons et al. |
| 2007/0136753 A1 | 6/2007 | Bovenschulte et al. |
| 2007/0157106 A1 | 7/2007 | Bishop |
| 2008/0059312 A1 | 3/2008 | Gern et al. |
| 2008/0066107 A1 | 3/2008 | Moonka et al. |
| 2008/0134235 A1 | 6/2008 | Kalaboukis |
| 2009/0006191 A1 | 1/2009 | Arankalle et al. |
| 2009/0013086 A1 | 1/2009 | Greenbaum |
| 2009/0063994 A1 | 3/2009 | Pickelsimer et al. |
| 2009/0064237 A1 | 3/2009 | Feldstein |
| 2009/0073318 A1 | 3/2009 | Shanks et al. |
| 2009/0089352 A1 | 4/2009 | Davis et al. |
| 2009/0089840 A1 | 4/2009 | Shusman |
| 2009/0092374 A1 | 4/2009 | Kulas |
| 2009/0113053 A1 | 4/2009 | Van et al. |
| 2009/0133078 A1 | 5/2009 | Hamano et al. |
| 2009/0148124 A1 | 6/2009 | Athsani et al. |
| 2009/0150941 A1 | 6/2009 | Riedl et al. |
| 2009/0210790 A1 | 8/2009 | Thomas |
| 2009/0210899 A1 | 8/2009 | Lawrence-Apfelbaum et al. |
| 2009/0222854 A1 | 9/2009 | Cansler et al. |
| 2009/0233542 A1 | 9/2009 | Gratton et al. |
| 2009/0235298 A1 | 9/2009 | Carlberg et al. |
| 2009/0249223 A1 | 10/2009 | Barsook et al. |
| 2009/0293079 A1 | 11/2009 | McKee et al. |
| 2009/0307721 A1 | 12/2009 | Afram et al. |
| 2009/0317053 A1 | 12/2009 | Morley et al. |
| 2009/0328113 A1 | 12/2009 | Van |
| 2009/0328122 A1 | 12/2009 | Amento et al. |
| 2010/0017474 A1 | 1/2010 | Kandekar et al. |
| 2010/0050222 A1 | 2/2010 | Legallais et al. |
| 2010/0057924 A1 | 3/2010 | Rauber et al. |
| 2010/0145820 A1 | 6/2010 | Johnson et al. |
| 2010/0164989 A1 | 7/2010 | Margalit et al. |
| 2011/0072452 A1 | 3/2011 | Shimy et al. |
| 2011/0078717 A1 | 3/2011 | Drummond et al. |
| 2011/0099069 A1 | 4/2011 | Hoelz et al. |
| 2011/0107215 A1 | 5/2011 | Klappert |
| 2011/0126252 A1 | 5/2011 | Roberts et al. |
| 2011/0145881 A1 | 6/2011 | Hartman et al. |
| 2011/0219098 A1 | 9/2011 | Xu et al. |
| 2011/0231878 A1 | 9/2011 | Hunter et al. |
| 2011/0238495 A1 | 9/2011 | Kang |
| 2011/0264599 A1 | 10/2011 | Dalton |
| 2012/0110621 A1 | 5/2012 | Gossweiler, III |
| 2012/0137316 A1 | 5/2012 | Elizarov et al. |
| 2012/0158544 A1* | 6/2012 | Nations .............. G06Q 30/0623 705/26.61 |
| 2012/0232977 A1 | 9/2012 | Calman et al. |
| 2012/0257112 A1 | 10/2012 | Fritsch |
| 2012/0271715 A1 | 10/2012 | Morton et al. |
| 2013/0014169 A1 | 1/2013 | Sansom et al. |
| 2013/0019261 A1 | 1/2013 | Huber et al. |
| 2013/0027613 A1 | 1/2013 | Kim et al. |
| 2013/0030953 A1 | 1/2013 | Marsic |
| 2013/0031582 A1 | 1/2013 | Tinsman et al. |
| 2013/0036442 A1 | 2/2013 | Wingert |
| 2013/0061262 A1 | 3/2013 | Briggs et al. |
| 2013/0132515 A1 | 5/2013 | Mostafa et al. |
| 2013/0167168 A1 | 6/2013 | Ellis et al. |
| 2013/0173765 A1 | 7/2013 | Korbecki |
| 2013/0304582 A1 | 11/2013 | Teichner et al. |
| 2014/0067581 A1 | 3/2014 | Yamahara |
| 2014/0081954 A1 | 3/2014 | Elizarov |
| 2014/0118474 A1 | 5/2014 | Fluhr et al. |
| 2014/0150029 A1 | 5/2014 | Avedissian et al. |
| 2014/0173660 A1 | 6/2014 | Correa et al. |
| 2014/0189140 A1 | 7/2014 | Takahashi |
| 2014/0195675 A1 | 7/2014 | Silver |
| 2014/0215529 A1 | 7/2014 | Good et al. |
| 2014/0244488 A1 | 8/2014 | Kim et al. |
| 2014/0244828 A1 | 8/2014 | Besehanic |
| 2014/0282111 A1 | 9/2014 | Gurbag et al. |
| 2015/0019346 A1 | 1/2015 | Masuko |
| 2015/0026715 A1 | 1/2015 | Bernstein et al. |
| 2015/0067739 A1* | 3/2015 | Kelley .............. H04N 21/47205 725/60 |
| 2015/0074716 A1 | 3/2015 | Redmann et al. |
| 2015/0163311 A1 | 6/2015 | Heath et al. |
| 2015/0248656 A1 | 9/2015 | Hasegawa et al. |
| 2015/0281635 A1 | 10/2015 | Tang et al. |
| 2015/0289022 A1* | 10/2015 | Gross .................. H04N 21/4725 725/51 |
| 2015/0312607 A1 | 10/2015 | Walker et al. |
| 2015/0318020 A1 | 11/2015 | Pribula |
| 2016/0006817 A1 | 1/2016 | Mitic et al. |

(56) References Cited

U.S. PATENT DOCUMENTS

| | | |
|---|---|---|
| 2016/0006981 A1 | 1/2016 | Bauman et al. |
| 2016/0037217 A1 | 2/2016 | Harmon et al. |
| 2016/0073055 A1 | 3/2016 | Marsh |
| 2016/0308934 A1 | 10/2016 | Gholmieh et al. |
| 2017/0244992 A1 | 8/2017 | Deshpande |

OTHER PUBLICATIONS

U.S. Appl. No. 15/839,048, filed Dec. 12, 2017, Final Office Action dated Jan. 7, 2018.
U.S. Appl. No. 15/872,936, filed Jan. 16, 2018, Response to Non-Final Office Action dated Jul. 25, 2018 filed on Oct. 12, 2018.
U.S. Appl. No. 15/872,936, filed Jan. 16, 2018, Final Office Action dated Jan. 14, 2019.
PCT Patent Application PTC/US2016/039314 filed on Jun. 24, 2016, International Search Report and Written Opinion dated Sep. 15, 2016.
U.S. Appl. No. 14/751,810, filed Jun. 26, 2015, Advisory Action dated Mar. 7, 2017.
U.S. Appl. No. 14/751,810, filed Jun. 26, 2015, Final Office Action dated Jan. 19, 2017.
U.S. Appl. No. 14/751,810, filed Jun. 26, 2015, Non-Final Office Action dated Jul. 10, 2017.
U.S. Appl. No. 14/751,810, filed Jun. 26, 2015, Non-Final Office Action dated Aug. 23, 2016.
U.S. Appl. No. 14/751,810, filed Jun. 26, 2015, Response to Non-Final Office Action dated on Jul. 10, 2017.
U.S. Appl. No. 14/751,810, filed Jun. 26, 2015, Response to Non-Final Office Action dated Aug. 23, 2016.
U.S. Appl. No. 14/751,810, filed Jun. 26, 2015, Response to Restriction/Election dated May 17, 2016.
U.S. Appl. No. 14/751,810, filed Jun. 26, 2015, Restriction/Election dated May 17, 2016.
U.S. Appl. No. 14/751,816, filed Jun. 26, 2015, Final Office Action dated Jul. 21, 2017.
U.S. Appl. No. 14/751,816, filed Jun. 26, 2015, Non-Final Office Action dated Jan. 23, 2018.
U.S. Appl. No. 14/751,816, filed Jun. 26, 2015, Non-Final Office Action dated Feb. 3, 2017.
U.S. Appl. No. 14/751,816, filed Jun. 26, 2015, Response to Final Office Action dated Jul. 21, 2017.
U.S. Appl. No. 14/751,816, filed Jun. 26, 2015, Response to Non-Final Office Action dated Jan. 23, 2018.
U.S. Appl. No. 14/751,816, filed Jun. 26, 2015, Response to Non-Final Office Action dated Feb. 3, 2017.
U.S. Appl. No. 14/751,816, filed Jun. 26, 2015, Response to Restriction/Election dated Jul. 21, 2016.
U.S. Appl. No. 14/751,816, filed Jun. 26, 2015, Restriction/Election dated Jul. 21, 2016.
U.S. Appl. No. 14/751,823, filed Jun. 26, 2015, Final Office Action dated Aug. 1, 2017.
U.S. Appl. No. 14/751,823, filed Jun. 26, 2015, Final Office Action dated Oct. 31, 2016.
U.S. Appl. No. 14/751,823, filed Jun. 26, 2015, Non-Final Office Action dated Mar. 15, 2017.
U.S. Appl. No. 14/751,823, filed Jun. 26, 2015, Non-Final Office Action dated Jun. 6, 2016.
U.S. Appl. No. 14/751,823, filed Jun. 26, 2015, Notice of Allowance dated Dec. 12, 2017.
U.S. Appl. No. 14/751,823, filed Jun. 26, 2015, Response to Final Office Action dated Aug. 1, 2017.
U.S. Appl. No. 14/751,823, filed Jun. 26, 2015, Response to Final Office Action dated Oct. 31, 2016.
U.S. Appl. No. 14/751,823, filed Jun. 26, 2015, Response to Non-Final Office Action dated Mar. 15, 2017.
U.S. Appl. No. 14/751,823, filed Jun. 26, 2015, Response to Non-Final Office Action dated Jun. 6, 2016.
U.S. Appl. No. 14/751,831, filed Jun. 26, 2015, Non-Final Office Action dated May 19, 2017.
U.S. Appl. No. 14/751,831, filed Jun. 26, 2015, Response to Non-Final Office Action dated May 19, 2017.
U.S. Appl. No. 14/751,831, filed Jun. 26, 2015, Final Office Action dated Sep. 27, 2016.
U.S. Appl. No. 14/751,831, filed Jun. 26, 2015, Response to Final Office Action dated Sep. 27, 2016.
U.S. Appl. No. 14/751,831, filed Jun. 26, 2016, Non-Final Office Action dated May 4, 2016.
U.S. Appl. No. 14/751,831, filed Jun. 26, 2016, Notice of Allowance dated Sep. 29, 2017.
U.S. Appl. No. 14/751,831, filed Jun. 26, 2016, Response to Non-Final Office Action dated May 4, 2016.
U.S. Appl. No. 15/839,048, filed Dec. 12, 2017, Non-Final Office Action dated Jun. 14, 2018.
U.S. Appl. No. 15/872,936, filed Jan. 16, 2018, Non-Final Office Action dated Jul. 25, 2018.
U.S. Appl. No. 15/872,936, filed Jan. 16, 2018, Non-Final Office Action dated May 8, 2019.
U.S. Appl. No. 15/839,048, filed Dec. 12, 2017, Non-Final Office Action dated May 21, 2019.
U.S. Appl. No. 14/751,816, filed Jun. 26, 2015, Notice of Allowance dated Jul. 8, 2019.

\* cited by examiner

ELECTRONIC COMMERCE FUNCTIONALITY IN VIDEO OVERLAYS

CROSS-REFERENCE TO RELATED APPLICATIONS

This application is a continuation of co-pending U.S. utility application entitled, "Electronic Commerce Functionality in Video Overlays," having application Ser. No. 14/751,823, filed Jun. 26, 2015, which is entirely incorporated herein by reference.

BACKGROUND

Historically, shopping is an activity that has involved a customer visiting a number of brick-and-mortar retail stores, browsing through inventory, selecting products of interest, and checking out to complete a purchase. Mail order companies introduced catalog-based shopping, whereby a customer peruses a printed catalog, views a catalog listing, and then places an order for a product via letter or telephone. The ordered product is delivered to the customer's premise a few days later. Although convenient, catalog-based shopping has inherent disadvantages, such as a lack of photo views of a product. High printing costs limited the number of photos of a product, particularly with respect to different angles or product variations.

During the early 1980s, home shopping channels on cable television were introduced. The home shopping channels offered television programming that described products for sale that could be ordered by phone. Viewers would regularly tune-in to see products that were displayed and talked about by live hosts. Enthusiastic personalities often developed a loyal following, and the shopping channels would give many hosts creative freedom in merchandising products.

Home shopping channels became less relevant with the introduction of Internet-based retailing in the late 1990s. Web sites offered photos and information about products without limit, greatly improving upon the previous analogue of printed catalogs. Product videos and animations could be provided, with 360 degree views of products. The online catalogs could be searched, and offerings of many competing retailers could be found instantly.

As compared with home shopping television channels, online retailers may lack the human component that motivates people to purchase. Sites such as YOUTUBE that offer user-created videos have become hugely popular with the "Millennial" generation. In fact, "how-to" videos have become an important driver of purchasing decisions among Millennials. For example, a person may create a video showing others how to use a particular product. During the video, the person may express opinions regarding the product. Viewers may then be motivated to purchase the product after viewing the video.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to providing an interactive shopping experience in conjunction with live video streams that discuss items offered for order. Traditional home shopping channels, despite having energetic personalities and loyal viewers, have not adapted well to the online arena. When a show host mentions a particular product, a viewer may then need to open a browser window or mobile application and search for the product. It may be difficult for the viewer to remember details of the product that would enable formulation of a good search query. Moreover, the search engine used by the viewer may provide relevant advertising that directs the viewer's attention away from the site of the home shopping channel. For example, the search engine may promote competing offers for the product.

Approaches may be used to market items in connection with prerecorded video shorts. For example, the Video Player Ad-Serving Interface Definition (VPAID) provides an application programming interface (API) for serving advertisements in conjunction with playback of digital video content. The Video Ad-Serving Template (VAST) is another technology that provides an advertisement response format that enables video advertisements to be served by compatible video players. VPAID and VAST are standards promulgated by the Interactive Advertising Bureau.

Various embodiments of the present disclosure introduce approaches for serving interactive content in conjunction with live video streams, such as live shopping programs that discuss items available for order or pre-order via an electronic commerce system or electronic marketplace. User interfaces are disclosed that facilitate presentation of orderable items alongside a live video stream. Some user interfaces may include a chat functionality for viewers to communicate with the program host and/or other viewers. Orderable items may be injected into the chat functionality as desired by the program host. In addition to orderable items, program hosts may inject other interactive actions into the user interfaces, such as viewer voting actions and others. Some user interfaces may incorporate overlays on top of the live video stream, where the overlays enable an interactive action. Furthermore, various embodiments are disclosed for synchronizing interactive content with the live video stream, with the understanding that the live video stream may be subject to some level of delay by the time at which it is rendered by a client device.

Various approaches relevant to interactive shopping interfaces are described in U.S. patent application entitled "LIVE VIDEO STREAM WITH INTERACTIVE SHOPPING INTERFACE," filed on even date herewith under, and U.S. patent application No. 14/751,810 entitled "SYNCHRONIZING INTERACTIVE CONTENT WITH A LIVE VIDEO STREAM," filed on even date herewith under U.S. patent application No. 14/751,816, which are incorporated herein by reference in their entirety.

Figure 1:
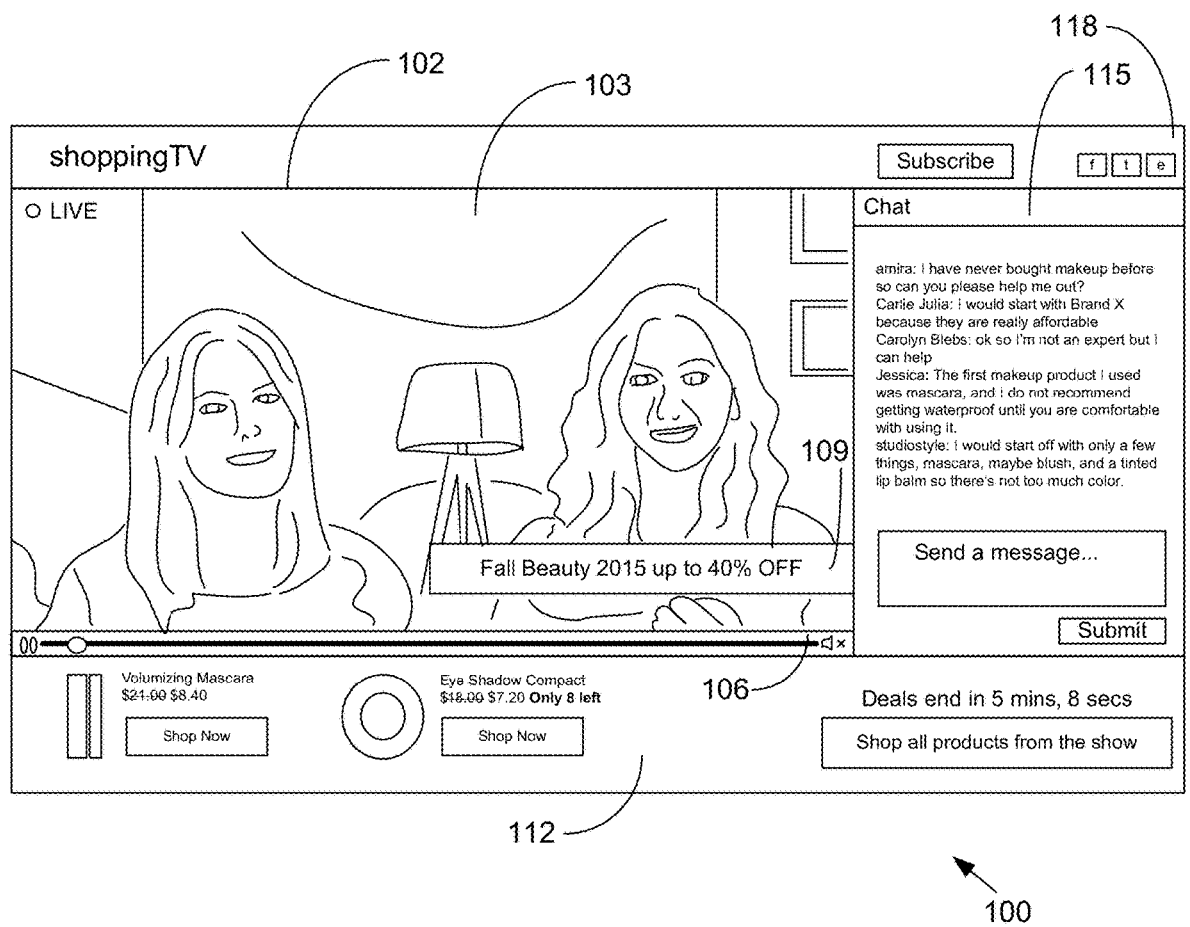
FIG. 1 is a pictorial diagram of an example user interface rendered according to various embodiments of the present disclosure.

Referring now to FIG. 1, shown is a pictorial diagram of an example user interface 100 rendered according to various embodiments of the present disclosure. The user interface 100 corresponds to an interactive shopping interface, including a player interface 102 that is rendering a live video stream 103. The live video stream shows one or more hosts discussing a sequence of items that are featured within the program. The items are offered for ordering via an associated electronic commerce system. The player interface 102 may include various player controls 106 that may allow a viewer to jump to an earlier point in the live video stream, pause the live video stream, stop the live video stream, adjust the volume of the live video stream, and so on. One or more graphical overlays 109 may be superimposed over a portion of the frame of the live video stream, where a selection of a graphical overlay 109 may cause an interactive action relative to one or more items to be performed.

The user interface 100 may also include a shopping interface 112. The shopping interface 112 may be rendered as a panel (as shown in FIG. 1) or may be rendered as an overlay on top of a portion of the live video stream. Alternatively, the shopping interface 112 may be rendered upon another display or in another window. The shopping interface 112 includes information about items currently being discussed within a segment of the live video stream. This information may include an item image, an item title, an item price, a quantity remaining indication, and/or other information.

For each item, a selectable item component may be provided (e.g., a button, link, item image, or infographic) such that when the selectable item component is selected, an interactive action relative to the item is performed. Such an interactive action may include adding the item to a shopping cart, initiating an order or purchase of the item, viewing an item detail page with more information about the item, casting a vote in respect to the item, saving the item for future reference, causing another image or video of the item to be rendered, or other actions. Where multiple versions of the item are offered, the interactive action may be with respect to a preselected one of the versions. In some cases, a user may select a version in the item detail page. Additionally, the shopping interface 112 may include a time limit for current offers, a selectable component to show all items discussed in the live video stream, and so on.

As the live video stream progresses, the content of the shopping interface 112 may be updated. A live video stream according to some approaches may be divided into segments, and the shopping interface 112 may include items featured or discussed in a current segment. In one embodiment, the shopping interface 112 may comprise a "shoveler" component configured to display information regarding only a subset of the items within a viewport. However, the user may scroll or otherwise manipulate the viewport to see information regarding previously discussed items, or items that may be discussed in the future. In some cases, this viewport may update automatically to show different items as they are featured in the live video stream.

The user interface 100 may also include a chat interface 115 configured to facilitate interactive communication among viewers of the live video stream and hosts and producers of the live video stream. Messages sent through the chat interface 115 may be propagated to all other users. The messages may be subject to moderation by a producer. In one embodiment, the host or producer may cause item information to be pushed into the chat interface 115, where selection of a component of the item information may result in adding the item to a shopping cart, initiating an order or purchase of the item, viewing an item detail page with more information about the item, casting a vote in respect to the item, or other actions.

Further, social network integrations 118 may be provided to promote the currently featured item(s) and/or the live video stream via social networks, email, and/or other forms of communication. For example, a user may share a currently discussed item or the live video stream via a social network. A subscribe function may allow a user to keep up with items discussed via the live video stream and/or future programs of the live video stream. For instance, upon selecting a subscribe component, a user may opt into emails announcing live video streams.

Many variations on the user interface 100 are contemplated herein, including more simplified user interfaces 100 for devices having smaller displays. For smaller display devices, it may be that only the live video stream 103 and the shopping interface 112 are rendered simultaneously on the screen. In the following discussion, a general description of the system and its components is provided, followed by a discussion of the operation of the same.

Figure 2:
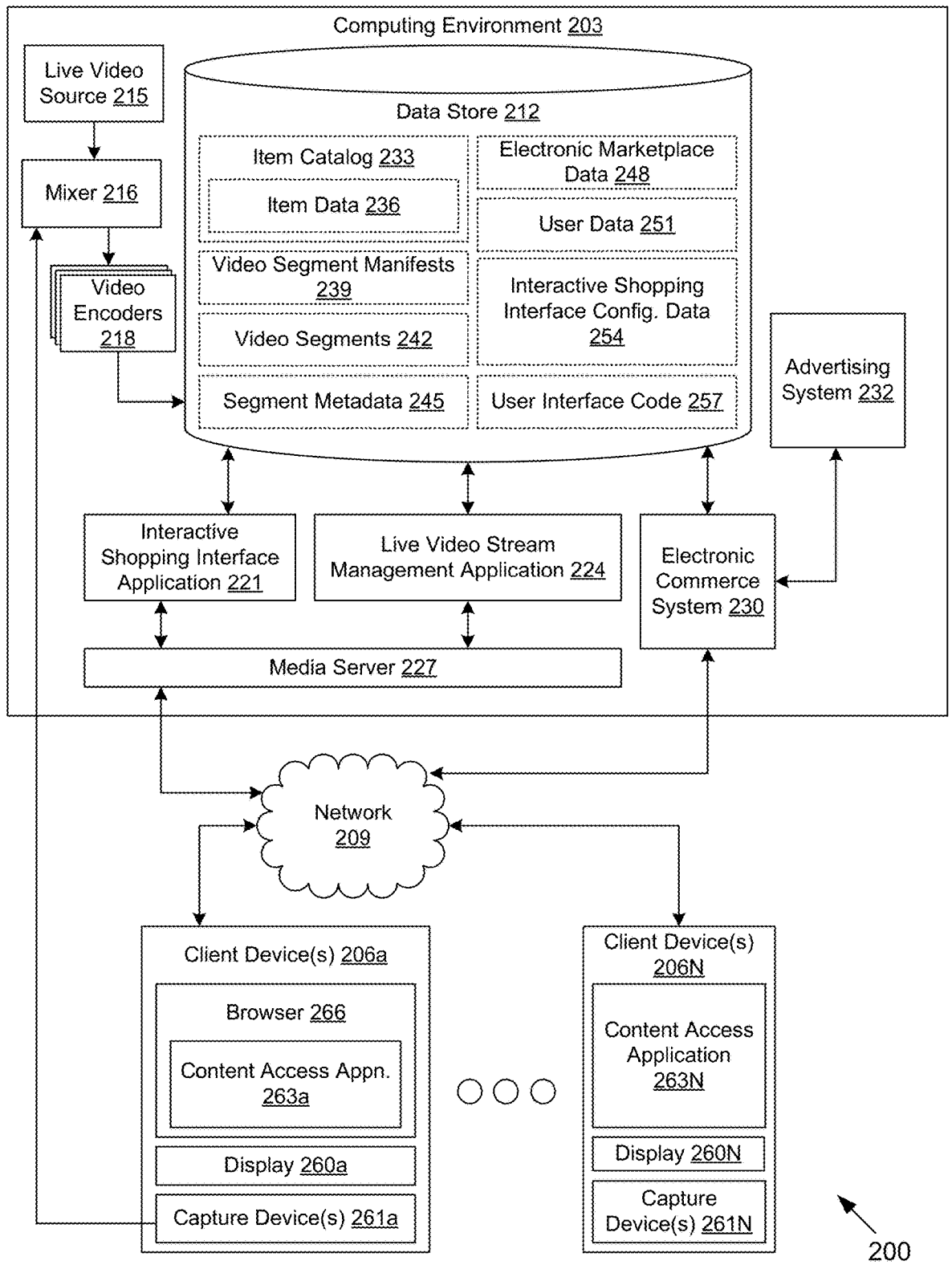
FIG. 2 is a schematic block diagram of a networked environment according to various embodiments of the present disclosure.

With reference to FIG. 2, shown is a networked environment 200 according to various embodiments. The networked environment 200 includes a computing environment 203 and a plurality of client devices 206a . . . 206N, which are in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed in the computing environment 203, for example, include a live video source 215, a video mixer 216, a plurality of video encoders 218, an interactive shopping interface application 221, a live video stream management application 224, a media server 227, an electronic commerce system 230, an advertising system 232, and other applications, services, processes, systems, engines, or functionality not discussed in detail herein.

The live video source 215 obtains live video feed from a video mixer and/or one or more cameras. The live video feed may be in an uncompressed or compressed format. The live video source 215 supplies the live video feed to a video mixer 216, which then provides a video feed to a plurality of video encoders 218. The video mixer 216 may combine the output of the live video source 215 with one or more live video feeds originating in client devices 206. For example, the video mixer 216 may combine a video feed of a program host with a video feed of a customer.

The video encoders 218 compress the live video feed using one or more codecs (e.g., Moving Pictures Experts Group (MPEG)-2, MPEG-4, High Efficiency Video Coding (HEVC), and/or other formats) in order to reduce the bitrate of the live video feed for multiple quality levels. The video encoders 218 may generate multiple versions of a live video stream (e.g., 8K, 4K, 1024p, 480i, etc.) that can be received by client devices 206 having differing available network bandwidths. The video encoders 218 may encode the live video feed into chunks or segments. These segments may be of a fixed length (e.g., ten seconds). In some cases, the video encoders 218 may produce multiple different views of the live video stream 103, such as a view of a customer being interviewed and a view of the host doing the interview.

The interactive shopping interface application 221 is executed to generate an interactive shopping interface to accompany a live video stream. To this end, the interactive shopping interface application 221 may determine items featured in the live video stream and then generate various metadata to be sent to the client devices 206. The metadata instructs the client devices 206 to render user interface components that facilitate an interactive shopping experience. The interactive shopping interface application 221 may also be configured to provide chat functionality that enables communication among multiple viewers of the live video stream.

The live video stream management application 224 is executed to control the presentation of the live video stream to the client devices 206. To this end, the live video stream management application 224 may generate manifests that point the client devices 206 to specific segment versions for the live video stream. The media server 227 is configured to send video data and interface data created by the interactive shopping interface application 221 and the live video stream management application 224 to the client devices 206. For example, the media server 227 may comprise a commercially available hypertext transfer protocol (HTTP) server. The media server 227 may serve data via HTTP, real-time transfer protocol (RTP), real-time streaming protocol (RTSP), or other protocols.

The electronic commerce system 230 is executed in order to facilitate the online order of items over the network 209 through an electronic marketplace in which one or more sellers participate. The electronic marketplace may be operated by a proprietor who may also be a seller. The electronic commerce system 230 also performs various backend functions associated with the online presence of a seller in order to facilitate the online order of items. For example, the electronic commerce system 230 may generate network content such as web pages, mobile application data, or other forms of content that are provided to client devices 206 for the purposes of selecting items for purchase, rental, download, lease, or other forms of consumption. The advertising system 232 may link to the electronic commerce system 230 to provide advertising to be included within item detail pages, search result pages, category pages, and/or other content served by the electronic commerce system 230. The advertising system 232 in some embodiments may also provide advertising to be injected into the live video stream 103 or the shopping interface 112.

The data stored in the data store 212 includes, for example, an item catalog 233 storing item data 236, video segment manifests 239, video segments 242, segment metadata 245, electronic marketplace data 248, user data 251, interactive shopping interface configuration data 254, user interface code 257, and potentially other data. The item catalog 233 includes data regarding items offered for order through the electronic commerce system 230. Such items may include products, goods, services, digital content, and/or other items. The item data 236 may include titles, descriptions, weights, prices, quantities available, export restrictions, customer reviews, customer ratings, images, videos, version information, availability information, shipping information, and/or other data.

The video segments 242 correspond to segments of the live video stream that are served to client devices 206. Multiple versions of each segment may be encoded using different bitrates or codecs. The segment metadata 245 corresponds to a sequence of items featured during a video segment 242 or discussed by one or more hosts during the video segment 242. In some cases, the video segment 242 may be different from a "shopping segment" used to group items in interactive shopping interfaces. In particular, a "shopping segment" may correspond to multiple video segments 242. A producer or host may generate the segment metadata 245 in advance or in real-time while the live video stream is created. The video segment manifests 239 may include locator information (e.g., uniform resource locators (URLs)) indicating where specific versions of video segments 242 may be obtained. In one embodiment, the video segment manifests 239 may be used to implement the HTTP Live Streaming (HLS) protocol. Further, the video segment manifests 239 may encode the segment metadata 245 associated with the particular video segment 242.

The electronic marketplace data 248 includes data relating to offers of items for order or preorder via an electronic marketplace implemented by the electronic commerce system 230. The user data 251 may include personal information of a user such as account information, order history, browse history via the electronic commerce system 230, items seen via the interactive shopping interface, video segments 242 viewed, chat history, and/or other data.

The interactive shopping interface configuration data 254 configures the operation of the interactive shopping interface application 221. For instance, the interactive shopping interface configuration data 254 may include layout parameters, available options, and so on, to control the appearance of the interactive shopping interface. The user interface code 257 is used to implement the interactive shopping interface. To this end, the user interface code 257 may include code executable on the client device 206. The user interface code 257 may include hypertext markup language (HTML) data, JavaScript data, dynamic HTML (DHTML) data, video player code, and other data.

The client devices 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client devices 206 may include a display 260a . . . 260N. The displays 260 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc. The client devices 206 may also include one or more capture devices 261a . . . 261N such as image cameras, video cameras, microphones, three-dimensional video capture devices, and other capture devices.

The client devices 206 may be configured to execute various applications such as a content access application 263a . . . 263N and/or other applications. The content access application 263 may be executed in a client device 206, for example, to access network content served up by the computing environment 203 and/or other servers, thereby rendering a user interface 100 (FIG. 1) on the display 260. To this end, the content access application 263 may comprise a dedicated application as with client device 206N, or the content access application 263 may be executed in a browser 266, as is the case with client device 206a. The client devices 206 may be configured to execute applications beyond the content access application 263 and the browser 266 such as, for example, email applications, social networking applications, word processors, spreadsheets, and/or other applications.

Next, a general description of the operation of the various components of the networked environment 200 is provided. To begin, a user launches a content access application 263 and accesses a uniform resource locator (URL) associated with a live video stream with an interactive shopping interface. Various user interface code 257 may be sent to the client device 206 for client-side execution. A live video stream 103 (FIG. 1) begins playing via a player interface of the content access application 263. The live video stream 103 depicts one or more hosts discussing a sequence of items.

In advance or during the production of the live video stream 103, the hosts or producers of the live video stream 103 may create a sequence of items corresponding to the items to be discussed or featured. As the live video stream 103 progresses, the hosts or producers may select via a user interface which items are being discussed. The interactive shopping interface application 221 is thereby able to determine which items are discussed or featured at any given time. The hosts or producers may also manage the live video stream 103 via the live video stream management application 224. Approaches for managing live video streams with interactive shopping interfaces are discussed in U.S. patent application entitled "BROADCASTER TOOLS FOR INTERACTIVE SHOPPING INTERFACES," filed on even date herewith under U.S. patent application No. 14/751,831, which is incorporated herein by reference in its entirety.

While the live video stream 103 is being streamed to the client device 206 by the media server 227, information indicating the featured or discussed items is also sent to the client device 206 by the media server 227, either through a push or pull arrangement. The content access application 263 is configured to render an interactive shopping interface that presents information about the currently featured items. The interactive shopping interface may include selectable item components, corresponding to the items, that perform an interactive function or action, such as adding the item to a shopping list or cart via the electronic commerce system 230, initiating an order of an item via the electronic commerce system 230, causing an item detail page to be rendered, casting a vote in regard to an item, and so on. The content access application 263 is configured to maintain synchronization of the items shown in the interactive shopping interface with respect to the progress of the live video stream 103.

In addition, an item history or timeline user interface may show previously discussed items or items to be discussed in the future. The items in the timeline user interface may be grouped by video segment 242. A chat interface may enable communication among viewers of the live video stream 103 and potentially show hosts or producers. A voice chat subsystem and video chat subsystem may enable communication with users at client devices 206 by way of voice and/or video. A host or producer, through broadcaster tool interfaces, may cause selectable graphical overlays to be rendered over the live video stream 103. Selection of the selectable graphical overlays may cause an interactive function to be performed. Hosts or producers may also cause item information to be pushed to the client devices 206 within chat interfaces. Hosts or producers may also update other metadata such as time remaining, items ordered, pricing, viewer polls, and so on.

In one embodiment, commands originating from a client device 206 (e.g., a smartwatch, a verbally activated fixed microphone client) may be synchronized with the items that are currently being featured. Accordingly, a simple voice command (e.g., "buy this product") may cause an interactive function (e.g., initiating a purchase) to be performed with respect to a currently featured product. That is to say, once a user gives the command, the command may be returned to the computing environment 203. The computing environment 203 may determine that the same user who gave the command is also currently consuming a live video stream 103 by way of another client device 206. The computing environment 203 may then determine which item is currently being featured and then perform the interactive function with respect to that item.

Several examples of user interfaces will next be discussed. Although the examples herein involve a single display 260, it is understood that elements may be split across multiple displays 260, which may be coupled to the same client device 206 or a different client device 206. For example, a user may watch the live video stream 103 on a living room television and then follow along with the items discussed on a smartphone display. A user may transfer elements between multiple displays 260 and client devices 206. However, as described, the interactive shopping interface will be synchronized with the current state of the live video stream 103. To this end, timecode and/or other data may be exchanged between client devices 206 to maintain proper synchronization. Various approaches to using multiple displays 260 to present information regarding a video stream are described in U.S. patent application Ser. No. 14/034,055 entitled "PLAYBACK OF CONTENT USING MULTIPLE DEVICES" and filed on Sep. 23, 2013, which is incorporated herein by reference in its entirety.

Figure 3A:
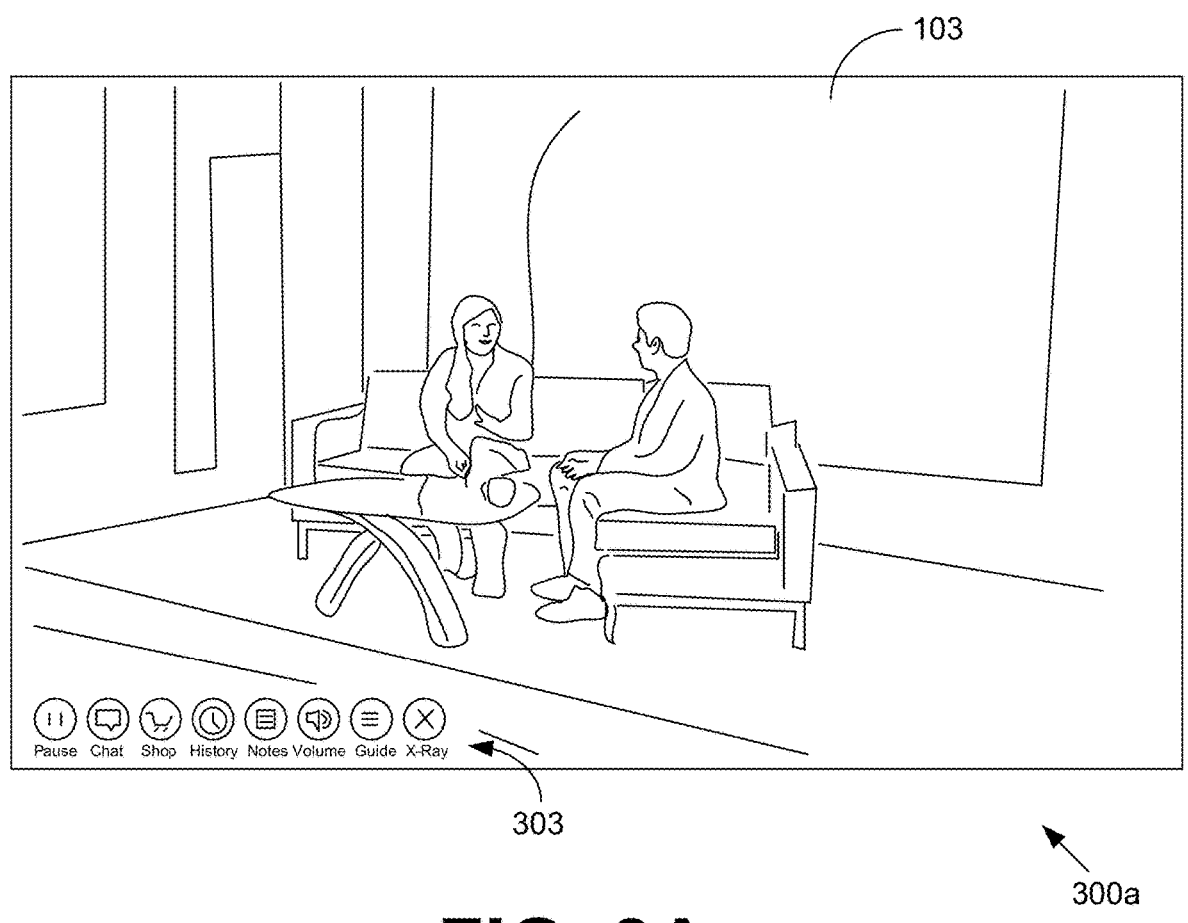
FIGS. 3A-3D are pictorial diagrams of example user interfaces rendered by a client device in the networked environment of FIG. 2 according to various embodiments of the present disclosure.

Referring next to FIG. 3A, shown is a pictorial diagram of an example user interface 300a rendered according to various embodiments of the present disclosure. The user interface 300a depicts a live video stream 103 that is maximized to provide more of an immersive user experience. The user interface 300a may fill a window of a browser 266 (FIG. 2) or a display 260 (FIG. 2) of a client device 206 (FIG. 2).

Various controls 303 may be rendered over a portion of the live video stream 103 as an overlay. User selection of the controls 303 may pause the live video stream 103, cause a chat interface to be rendered, cause an interactive shopping interface to be rendered, cause a history interface to be rendered, cause show notes to be rendered, adjust the volume of the audio of the live video stream 103, cause information about persons appearing or discussed in the live video stream 103 to be rendered, or perform other functions. In one embodiment, the controls 303 may be hidden after a period of user inactivity (e.g., a lack of keyboard input, touchscreen input, or mouse movement). An item history interface may display a listing of video programming previously watched via the media server 227 (FIG. 2), and may provide the ability to roll back in time.

Figure 3B:
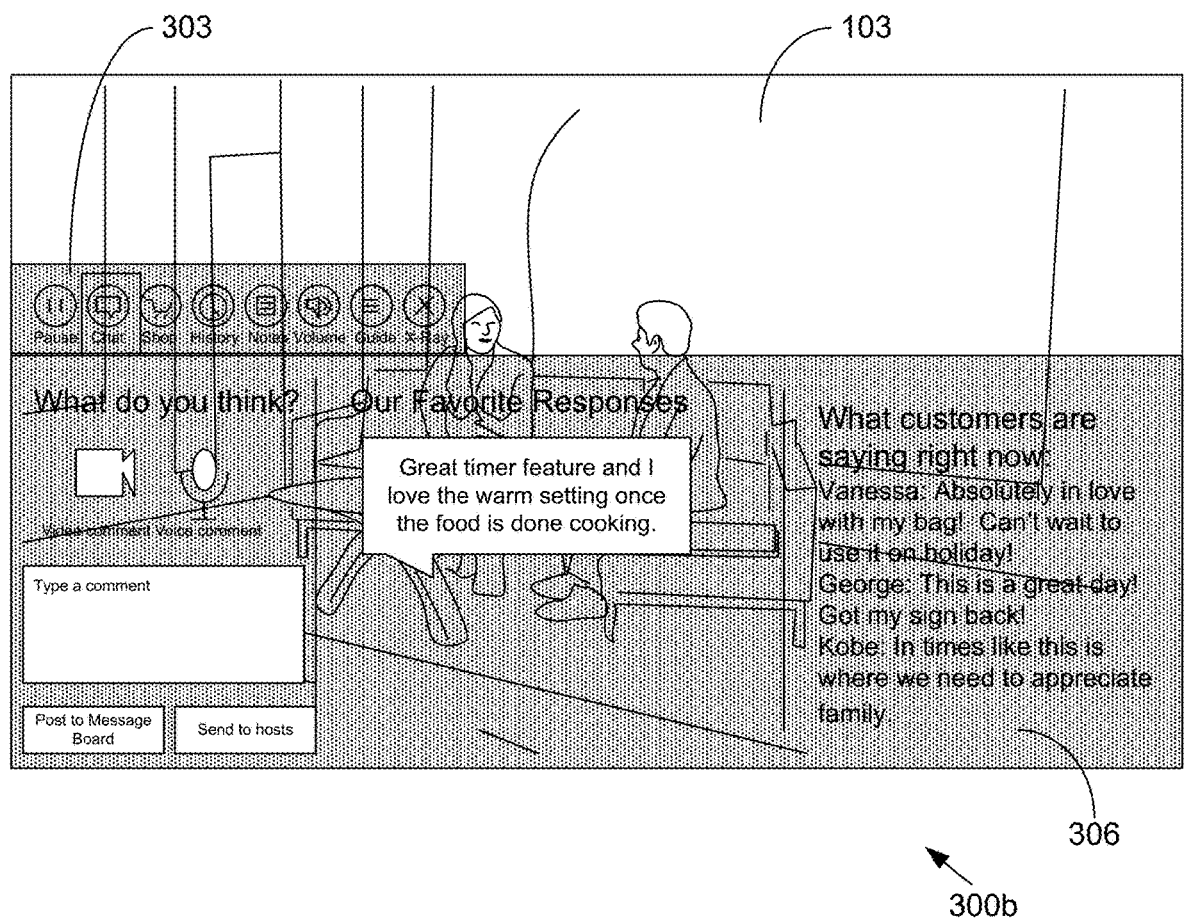

Turning now to FIG. 3B, shown is a pictorial diagram of another example user interface 300b rendered according to various embodiments of the present disclosure. The user interface 300b shows an example of a chat interface 306 rendered as an overlay on the live video stream 103 in response to the selection of a chat control 303. The chat interface 306 may facilitate communication among multiple users watching the live video stream 103 and may also include interaction with hosts, producers, interview guests, or other users associated with the live video stream 103.

The chat interface 306 may provide users the ability to submit text comments, video comments, and/or audio comments. Communications may be directed to all users, a subset of users, or directly to hosts and/or producers of the live video stream 103. Communications via the chat interface 306 may be subject to the approval of a moderator. Selected "favorite" communications may be featured or given prominence in the chat interface 306 ("Our Favorite Responses"). In some cases, communications from social networks may be featured in the chat interface 306. For example, a user may send a message via a social network that is associated with the current program of the live video stream 103 by way of a hashtag or other tag. A producer may use a broadcaster management interface to select appropriate ones of these messages to be featured in the chat interface 306.

In one scenario, a client device 206 may correspond to a fixed microphone client device 206 that continuously listens for wake words or other predefined verbal content. A user may say something relevant to the current live video stream 103, which may be recognized through a voice recognition system and then transmitted to a show producer. The show producer may then choose to feature the comment via the chat interface 306. In some cases, the sentiment of the user may be determined using voice recognition in connection with a fixed microphone client device 206 and tallied to provide to the producer or other end users via the chat interface 306 the general feeling of users towards currently featured items. For example, statistics may be gathered and presented as to whether users are feeling positive or negative towards a product currently being discussed in the live video stream 103.

The chat interface 306 may also include a viewport where current communications from users are displayed. A host or producer may have the ability to inject selectable item components and/or other information about items that are currently being discussed or otherwise featured in the live video stream 103. Such components or information may be injected within the chat interface 306, such as in the current communications viewport.

Figure 3C:
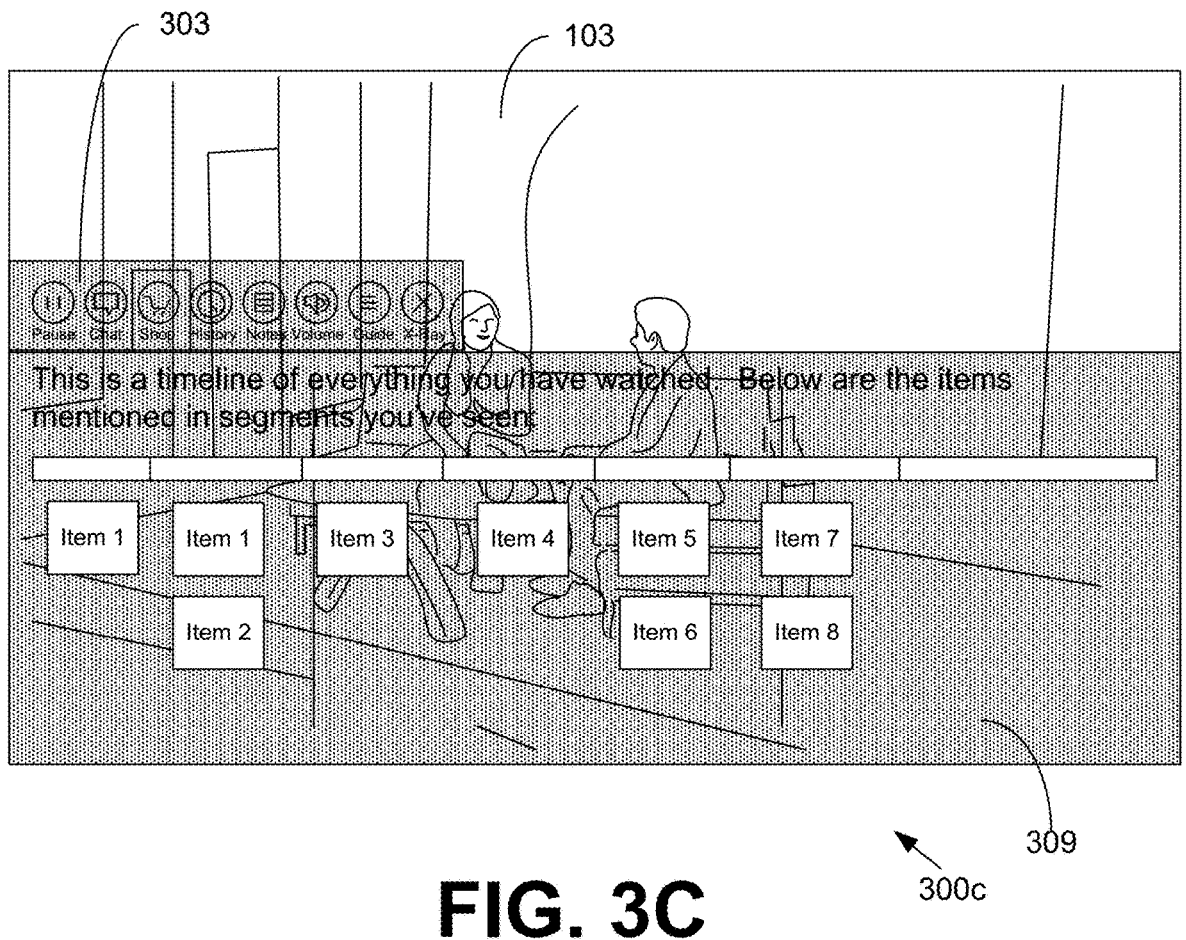

Moving on to FIG. 3C, shown is a pictorial diagram of another example user interface 300c rendered according to various embodiments of the present disclosure. The user interface 300c shows an example of an interactive shopping interface 309 rendered as an overlay on the live video stream 103 in response to the selection of a shopping control 303. In this example, the interactive shopping interface 309 includes a timeline that divides the live video stream 103 into segments, including past and/or future segments.

Associated with each segment is a list of items that were featured or discussed in the particular segment. In some cases, the items may include items that were shown but not discussed or explicitly featured (e.g., a coffee mug sitting on the show host's desk, or an article of clothing worn by a host but not explicitly mentioned, etc.). Also, the items may include other items from the item catalog 233 that are related to items that are featured or discussed (e.g., accessory items, similar items, items often purchased together or as alternatives, etc.). Each item can be represented by a selectable item component or indicia, which in this case may be an item thumbnail image. The interactive shopping interface 309 may include a viewport, where the user can manipulate the viewport (e.g., by scrolling or swiping) in order to see items associated with other segments on the timeline. The items that are shown may be those items that were featured or discussed in every segment of the live video stream 103. Alternatively, the list of items may be personalized based on what segments the user actually streamed.

The interactive shopping interface 309 may be dynamically updated to include new items for current and/or future segments. Also, what is displayed in the viewport may be dynamically adjusted to show what items are currently being discussed or featured in a current segment. Selection of the selectable item components may cause an interactive function or action to be performed (e.g., viewing an item detail page, adding the item to a shopping list or cart, initiating an order of the item, casting a vote with respect to the item, etc.). Although the interfaces shown in FIGS. 3A-3C include overlays, in other examples what is shown in the overlays may be rendered in distinct user interface panels or on different displays 260 as compared to the live video stream 103.

In some embodiments, the interactive shopping interface 309 may also present items submitted by users as being relevant to the items that are discussed or featured. For instance, if a show is currently discussing one type of black pants available for purchase, a user may tag another type of black pants that is potentially relevant or comparable. The other type of black pants may also be offered by the electronic commerce system 230. The users may submit the related items by way of a social network, for example, by associating a particular hashtag with an item detail page link or item description. The tagged items, potentially subject to moderator approval, may then be populated in the interactive shopping interfaces 309 of other users for rendering as selectable item components.

In other examples, a localized search component may be rendered in the user interface 300d. This could be a form field that is configured to receive a search query. The search query could be evaluated against the titles and descriptions for all items presented via the interactive shopping interface 309. In some cases, the search query could be evaluated against the verbal dialogue or visual text previously presented in the live video stream 103.

Figure 3D:
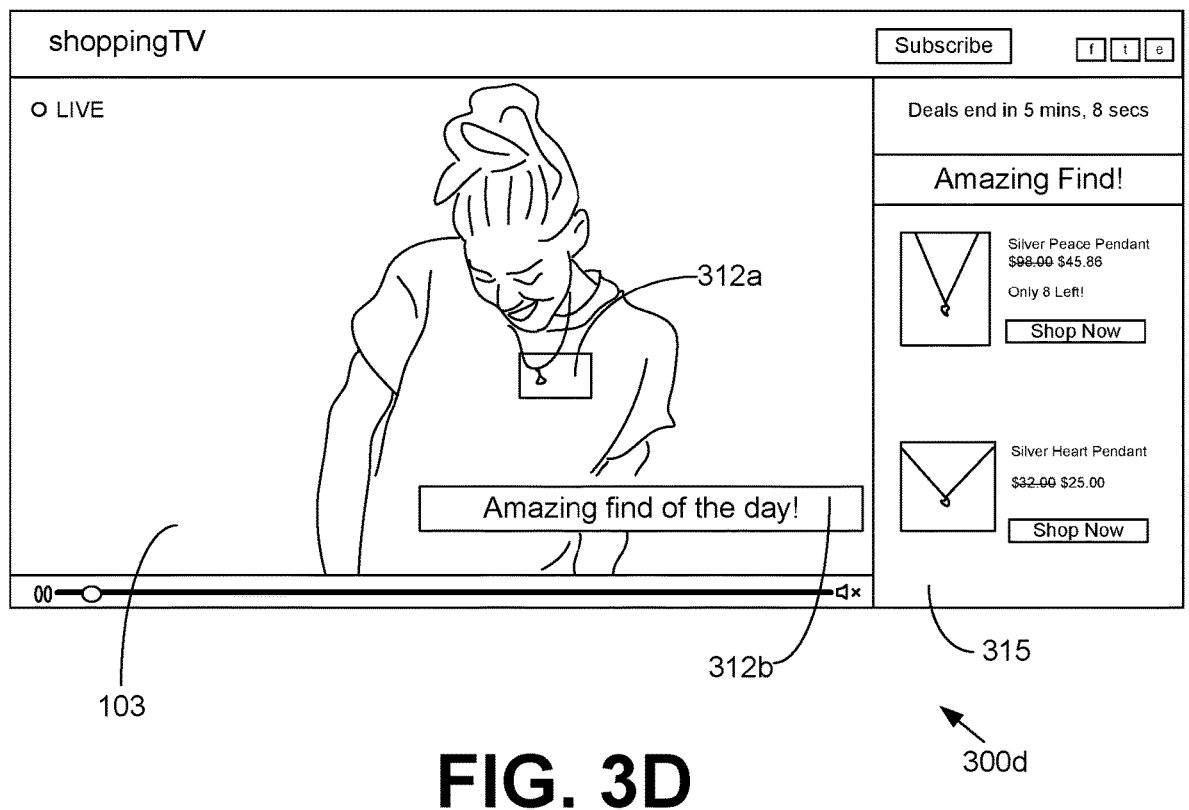

Turning now to FIG. 3D, shown is a pictorial diagram of another example user interface 300d rendered according to various embodiments of the present disclosure. In the user interface 300d, a selectable graphical overlay 312a is rendered on top of the live video stream 103. In this example, the selectable graphical overlay 312 corresponds to a rectangle that is superimposed over a graphical position of a corresponding item in the frame of the live video stream 103. The item here is a necklace, and the rectangle is shown relative to the necklace being worn by a person in the live video stream 103.

Another selectable graphical overlay 312b is also shown superimposed over the live video stream 103. The selectable graphical overlay 312b corresponds to a box labeled "Amazing find of the day." Both selectable graphical overlays 312a and 312b, when selected, may cause an interactive action to be performed relative to a corresponding item (e.g., viewing an item detail page, adding the item to a shopping list or cart, initiating an order of the item, casting a vote with respect to the item, etc.).

In addition, an interactive shopping interface 315 is included in the user interface 300d. For example, the interactive shopping interface 315 may include selectable item components that correspond to items currently featured or discussed in the live video stream 103. Item titles, item images, item prices, and/or other item information may be provided. The selectable item components may be selectable by way of a button or link that when selected causes an interactive action to be performed relative to the item.

Figure 4:
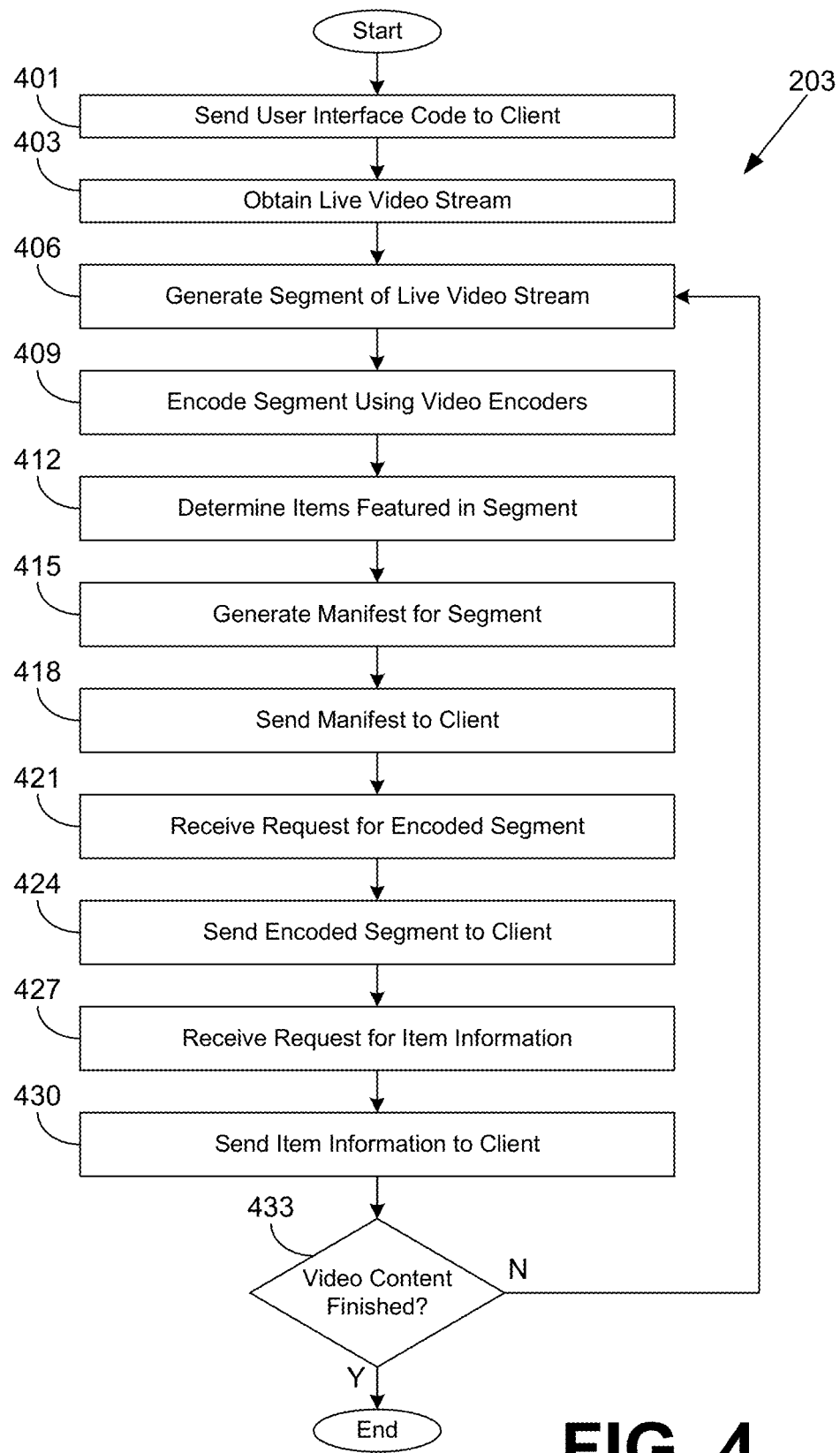
FIG. 4 is a flowchart illustrating one example of functionality implemented executed in a computing environment in the networked environment of FIG. 2 according to various embodiments of the present disclosure.

Referring next to FIG. 4, shown is a flowchart that provides one example of the operation of a portion of the computing environment 203 according to various embodiments. Portions of the flowchart of FIG. 4 may be performed by a media server 227 (FIG. 2), a live video source 215 (FIG. 2), a video encoder 218 (FIG. 2), an interactive shopping interface application 221 (FIG. 2), and/or a live video stream management application 224 (FIG. 2) in some embodiments. It is understood that the flowchart of FIG. 4 provides merely an example of the many different types of functional arrangements that may be employed to implement the operation of the portion of the computing environment 203 as described herein. As an alternative, the flowchart of FIG. 4 may be viewed as depicting an example of elements of a method implemented in the computing environment 203 according to one or more embodiments.

Beginning with box 401, the media server 227 sends user interface code 257 (FIG. 2) to a client device 206 (FIG. 2) in response to a request. For example, the client device 206 may open a connection to a specific uniform resource locator (URL) over the network 209 (FIG. 2), where the URL corresponds to a live video stream having an interactive shopping interface. In box 403, the live video source 215 obtains a live video stream. In box 406, the live video source 215 generates a video segment 242 (FIG. 2) of the live video stream. For example, the video segment 242 may corresponds to ten seconds of video stored within a buffer. In box 409, one or more video encoders 218 encode the video segment 242.

In box 412, the interactive shopping interface application 221 determines one or more items featured in the video segment 242. For example, the interactive shopping interface application 221 may receive a list of a sequence of items specified by a host or producer of the live video stream. The interactive shopping interface application 221 may then generate segment metadata 245 (FIG. 2) indicating items featured or discussed in the video segment 242. In box 415, the live video stream management application 224 may generate a video segment manifest 239 (FIG. 2), including multiple URLs corresponding to different encoded versions of the video segment 242. In generating the video segment manifest 239, the segment metadata 245 may be included to provide a time-based association of items with the video segment 242.

In box 418, the media server 227 sends the video segment manifest 239 to the client device 206 via the network 209. For example, the client device 206 may poll the media server 227 for a video segment manifest 239. Alternatively, the media server 227 may push the video segment manifest 239 to the client device 206. Subsequently, a request for an encoded video segment 242 is received from the client device 206 in box 421. The media server 227 sends the encoded video segment 242 to the client device 206 in box 424.

In box 427, the media server 227 receives a request for information about an item from the client device 206. For example, user interface code 257 now executed by the client device 206 may know from the video segment manifest 239 that a particular item (as identified by an item identifier) is associated with a video segment 242. The user interface code 257 may request additional item data 236 (e.g., title, price, image, ordering links, etc.) in order to render selectable item components or other item information in a user interface. In box 430, the media server 227 sends the requested item information to the client device 206.

In box 433, the media server 227 determines whether the live video stream has finished. If the live video stream has not finished, the flowchart returns to box 406, and another video segment 242 is captured by the live video source 215. If the live video stream has finished, the process proceeds to completion.

Figure 5:
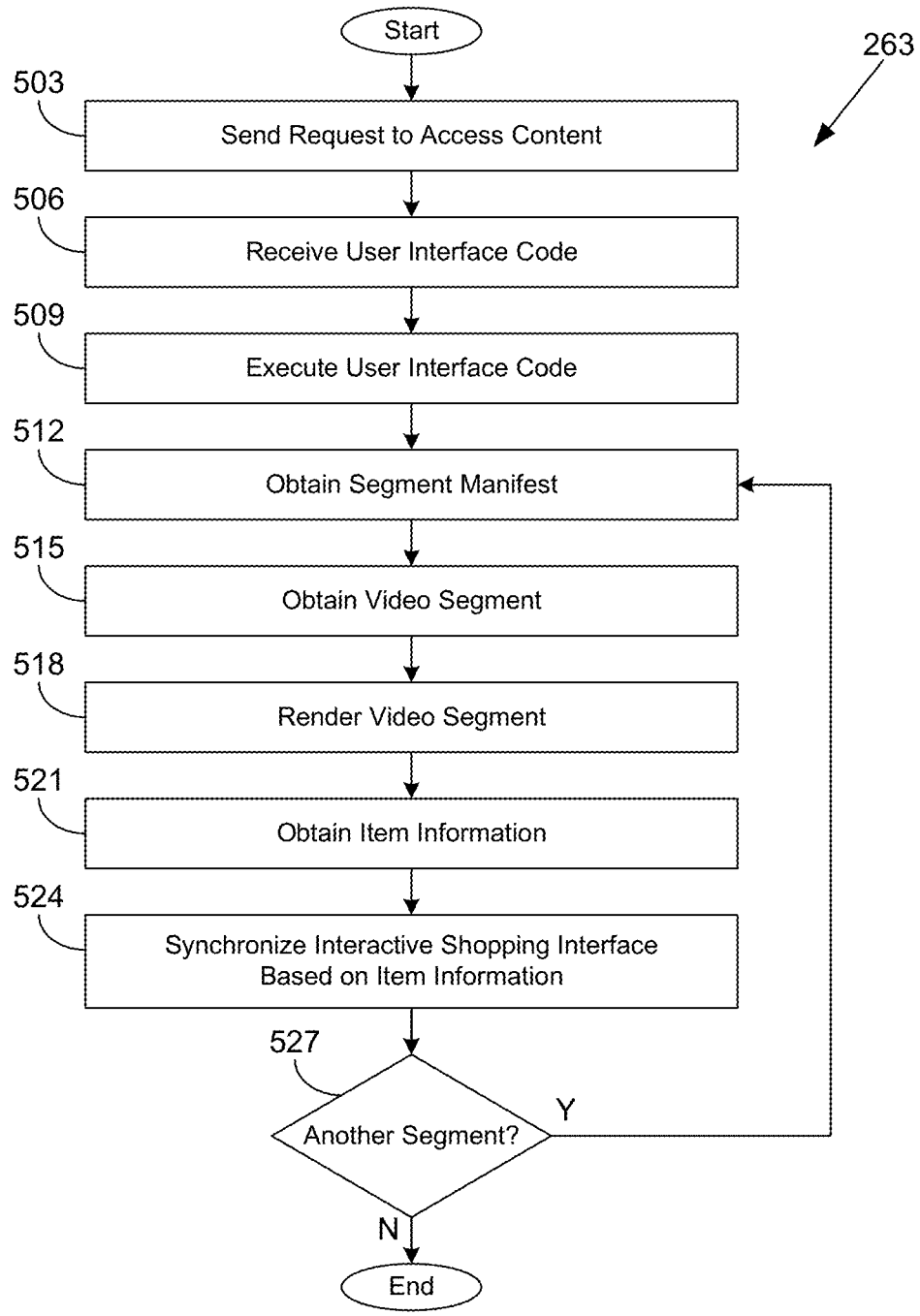
FIGS. 5-6B are flowcharts illustrating examples of functionality implemented as portions of a content access application executed in a client device in the networked environment of FIG. 2 according to various embodiments of the present disclosure.

Moving on to FIG. 5, shown is a flowchart that provides one example of the operation of a portion of the content access application 263 according to various embodiments. It is understood that the flowchart of FIG. 5 provides merely an example of the many different types of functional arrangements that may be employed to implement the operation of the portion of the content access application 263 as described herein. As an alternative, the flowchart of FIG. 5 may be viewed as depicting an example of elements of a method implemented in the client device 206 according to one or more embodiments.

Beginning with box 503, the content access application 263 sends a request to access content to the media server 227 (FIG. 2) via the network 209 (FIG. 2). In box 506, the content access application 263 receives the user interface code 257 (FIG. 2) from the media server 227. In box 509, the content access application 263 executes the user interface code 257.

In box 512, the content access application 263 obtains a video segment manifest 239 (FIG. 2) from the media server 227. From the video segment manifest 239, the content access application 263 is able to obtain a video segment 242 (FIG. 2) in box 515. In this respect, the content access application 263 may determine the available bandwidth via the network 209 or other configured parameters in order to determine a version of the video segment 242 that is to be requested (e.g., HD, SD, low quality, etc.). In box 518, the content access application 263 renders the video segment 242 upon a display 260 (FIG. 2).

In box 521, the content access application 263 obtains item information corresponding to items featured in the video segment 242. For example, the video segment manifest 239 may include segment metadata 245 that indicates the featured items. Alternatively, a separate channel may transmit the featured items from the media server 227 to the content access application 263 via a push or pull arrangement.

In box 524, the content access application 263 synchronizes an interactive shopping interface rendered upon the display 260 based at least in part on the received item information. In one embodiment, a latency observed at the client device 206 may be used to delay presentation of information about featured items, where the latency is caused by encoding delays, network buffering delays, rendering delays, and so on. For example, the content access application 263 may receive an indication that item X is discussed at 2:34 pm and 0 seconds. However, due to the various delays in transmitting the live video stream, the corresponding video where item X is discussed may not be rendered until 2:34 pm and 20 seconds. Accordingly, to maintain synchronization, the interactive shopping interface may not be updated to show information about item X until 2:34 pm and 20 seconds based at least in part on a calculated latency (i.e., 20 seconds). Also, in one embodiment, the segment metadata 245 may indicate an expiration time or a length of time that an item is to be featured. At the end of this period, the interactive shopping interface may be updated by the content access application 263 to remove, hide, or reclassify renderings of expired items.

In box 527, the content access application 263 determines whether another video segment 242 of the live video stream is available. If another video segment 242 is available, the content access application 263 returns to box 512 and obtains another video segment manifest 239. Otherwise, the operation of the portion of the content access application 263 ends.

Figure 6A:
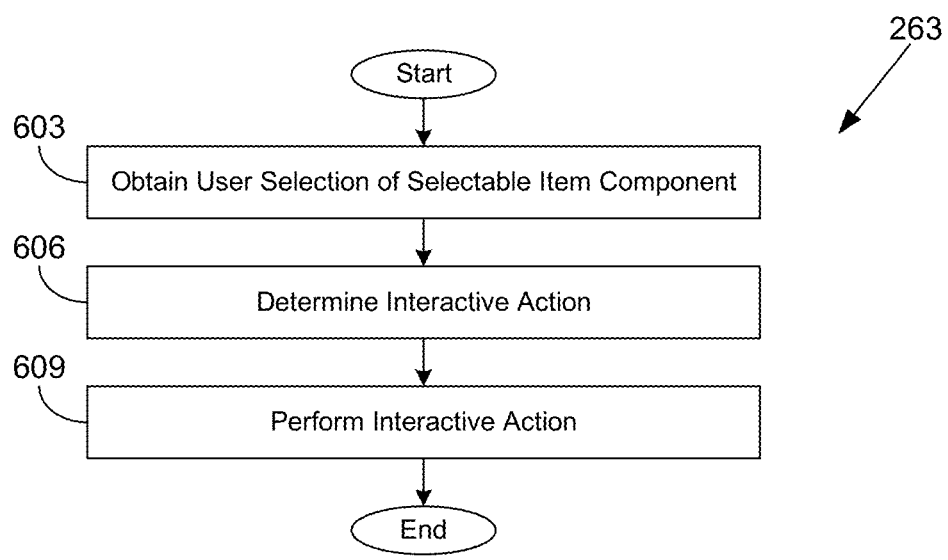

Continuing now to FIG. 6A, shown is a flowchart that provides one example of the operation of another portion of the content access application 263 according to various embodiments. It is understood that the flowchart of FIG. 6A provides merely an example of the many different types of functional arrangements that may be employed to implement the operation of the portion of the content access application 263 as described herein. As an alternative, the flowchart of FIG. 6A may be viewed as depicting an example of elements of a method implemented in the client device 206 according to one or more embodiments.

Beginning with box 603, the content access application 263 receives a user selection of a selectable item component rendered in an interactive shopping interface. For instance, the user may select an image of an item or may click a button associated with an item (e.g., labeled "shop now"). Alternatively, the selectable item component may correspond to a selectable graphical overlay as in FIG. 3D.

In box 606, the content access application 263 determines the interactive action to be performed with respect to the selectable item component and the item. As non-limiting examples, interactive actions may include adding the item to a shopping list or cart, viewing an item detail page, initiating an order of the item via the electronic commerce system 230 (FIG. 2), casting a vote in regard to the item, and so on.

In box 609, the content access application 263 performs the interactive action. In some scenarios, the interactive action may be an electronic commerce action, and the content access application 263 may invoke a uniform resource locator (URL) corresponding to the electronic commerce system 230 to perform the interactive action. Thereafter, the operation of the content access application 263 ends.

Figure 6B:
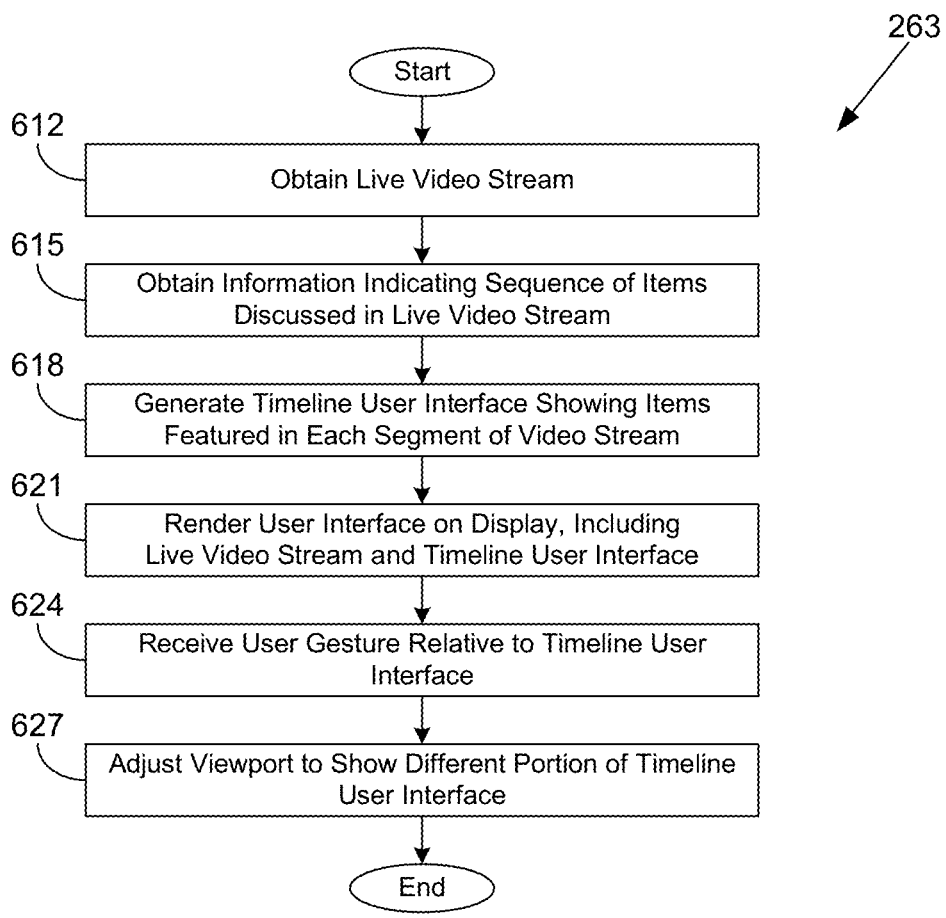

Referring next to FIG. 6B, shown is a flowchart that provides one example of the operation of another portion of the content access application 263 according to various embodiments. It is understood that the flowchart of FIG. 6B provides merely an example of the many different types of functional arrangements that may be employed to implement the operation of the portion of the content access application 263 as described herein. As an alternative, the flowchart of FIG. 6B may be viewed as depicting an example of elements of a method implemented in the client device 206 according to one or more embodiments.

Beginning with box 612, the content access application 263 obtains a live video stream 103 (FIG. 1) from a media server 227 (FIG. 2) via a network 209 (FIG. 2). In some cases, the content access application 263 may also obtain user interface code 257 (FIG. 2) from the media server 227 that include video player code and other code to render an interactive shopping interface. In box 615, the content access application 263 obtains information indicating a sequence of items discussed or otherwise featured in the live video stream 103. For example, the information may be included within a video segment manifest 239 (FIG. 2) used to obtain a current video segment 242 (FIG. 2). As an alternative, the information may be obtained separately via a poll arrangement on a periodic basis or via a push arrangement from the media server 227.

In box 618, the content access application 263 generates a timeline user interface showing the items featured in each video segment 242 of the live video stream 103. For purposes of the timeline user interface, the segments used in some instances may correspond to larger shopping segments that span multiple video segments 242. The video segments 242 may include past, current, and future segments. To this end, the content access application 263 may receive data encoding the timeline user interface from the media server 227. Alternatively, user interface code 257 (FIG. 2) executed in the client device 206 may create the timeline user interface.

In box 621, the content access application 263 renders a user interface on the display 260 (FIG. 2), where the user interface includes the live video stream 103 and a timeline user interface. In the timeline user interface, the sequence of items discussed may be individually grouped for each segment as in the example of FIG. 3C. In box 624, the content access application 263 receives a user gesture relative to the timeline user interface. The user gesture may be a scrolling gesture, a swiping gesture, a selection gesture, or other gesture. In box 627, the content access application 263 adjusts a viewport of the timeline user interface to show a different portion of the timeline user interface corresponding to other video segments 242 of the live video stream 103. Thereafter, the operation of the portion of the content access application 263 ends.

Figure 7:
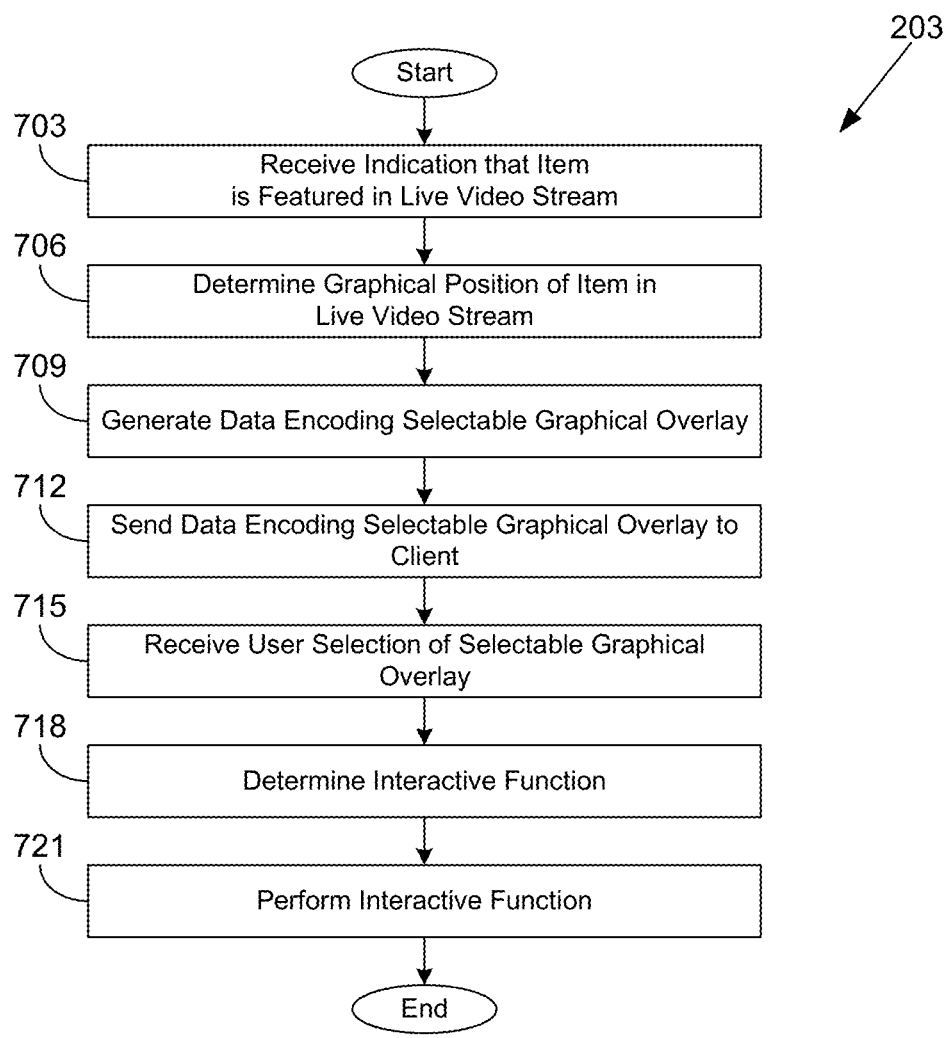
FIG. 7 is a flowchart illustrating one example of functionality implemented executed in a computing environment in the networked environment of FIG. 2 according to various embodiments of the present disclosure.

Moving on to FIG. 7, shown is a flowchart that provides one example of the operation of a portion of the computing environment 203 according to various embodiments. Portions of the flowchart of FIG. 7 may be performed by a media server 227 (FIG. 2), an interactive shopping interface application 221 (FIG. 2), and/or a live video stream management application 224 (FIG. 2) in some embodiments. It is understood that the flowchart of FIG. 7 provides merely an example of the many different types of functional arrangements that may be employed to implement the operation of the portion of the computing environment 203 as described herein. As an alternative, the flowchart of FIG. 7 may be viewed as depicting an example of elements of a method implemented in the computing environment 203 according to one or more embodiments.

Beginning with box 703, the interactive shopping interface application 221 receives an indication that an item is featured in a live video stream 103 (FIG. 1). In box 703, the interactive shopping interface application 221 determines a graphical position of the item in one or more frames of the live video stream 103. The graphical position may correspond to the relative position of the item within a window or a screen. For example, a producer or host user may supply coordinates corresponding to an approximate graphical position of the item. Alternatively, an automated image recognition system may recognize the item within the live video stream 103 and extract an approximate graphical position. Where the featured item has multiple versions or variants, the interactive shopping interface application 221 may identify the particular version being discussed in the live video stream 103.

In box 709, the interactive shopping interface application 221 generates data encoding a selectable graphical overlay with respect to the featured item. For example, the data may include Video Player Ad-Serving Interface Definition (VPAID) data. In box 712, the media server 227 sends the data encoding the selectable graphical overlay to the client device 206 (FIG. 2). In one embodiment, the data encoding the selectable graphical overlay may be sent within the segment metadata 245. The selectable graphical overlay may include a component (e.g., a drop-down box) configured to facilitate selection from a plurality of versions of the item. The particular version depicted or discussed in the live video stream may be selected by default.

In box 715, the media server 227 receives data indicating a user selection of the selectable graphical overlay from the client device 206. In box 718, the media server 227 determines an interactive function associated with the user selection. In this regard, the media server 227 may identify a selected version of the item, where multiple versions of the item may be selected. The interactive function may correspond to adding the item to a shopping list or cart, initiating an order of the item through the electronic commerce system 230 (FIG. 2), viewing the item detail page for the item, casting a vote with respect to the item, or other functions. In box 721, the media server 227 performs the interactive function. Thereafter, the process proceeds to completion.

Figure 8:
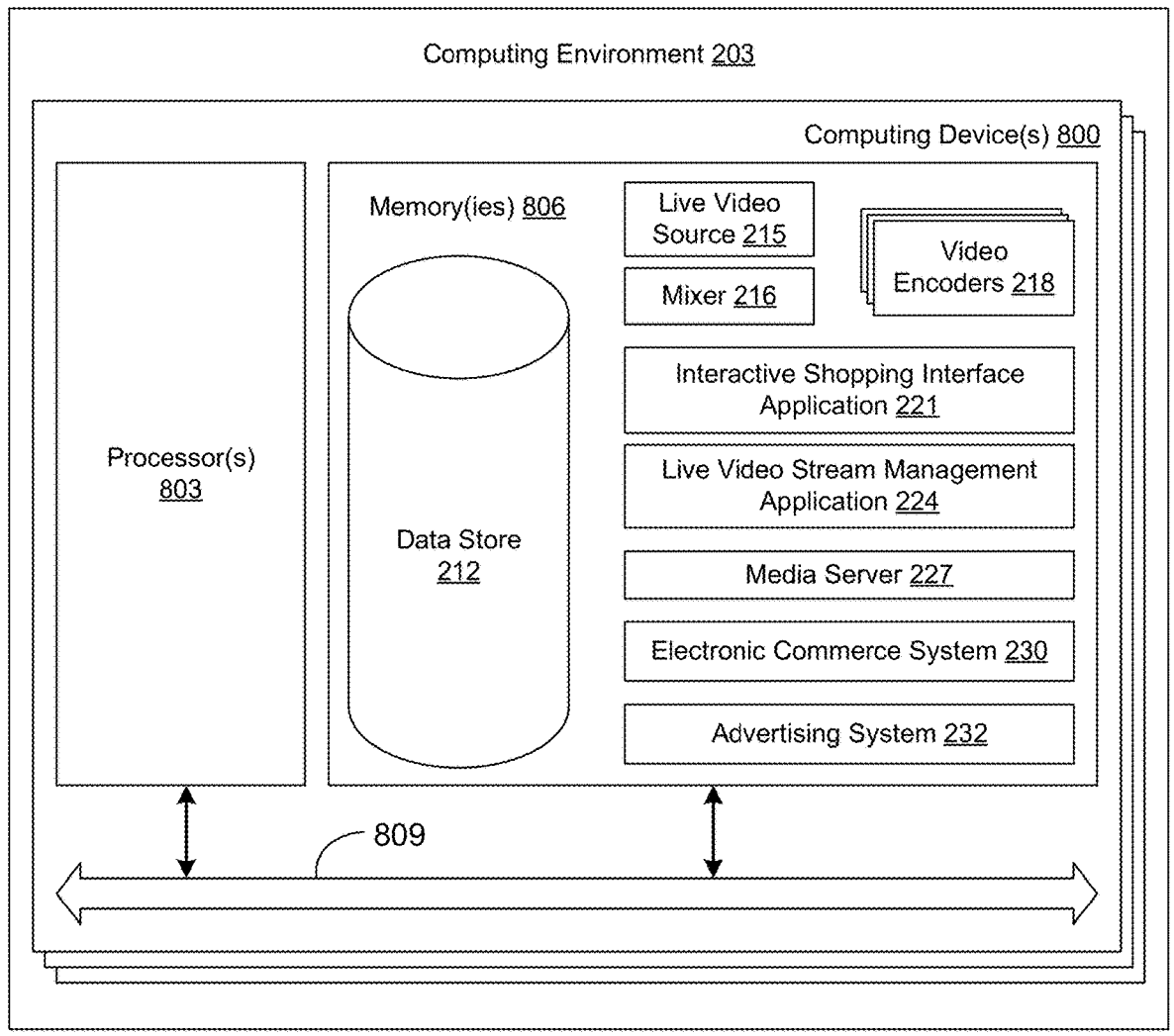
FIG. 8 is a schematic block diagram that provides one example illustration of a computing environment employed in the networked environment of FIG. 2 according to various embodiments of the present disclosure.

With reference to FIG. 8, shown is a schematic block diagram of the computing environment 203 according to an embodiment of the present disclosure. The computing environment 203 includes one or more computing devices 800. Each computing device 800 includes at least one processor circuit, for example, having a processor 803 and a memory 806, both of which are coupled to a local interface 809. To this end, each computing device 800 may comprise, for example, at least one server computer or like device. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803 are the live video source 215, the mixer 216, the plurality of video encoders 218, the interactive shopping interface application 221, the live video stream management application 224, the media server 227, the electronic commerce system 230, the advertising system 232, and potentially other applications. Also stored in the memory 806 may be a data store 212 and other data. In addition, an operating system may be stored in the memory 806 and executable by the processor 803.

It is understood that there may be other applications that are stored in the memory 806 and are executable by the processor 803 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 806 and are executable by the processor 803. In this respect, the term "executable" means a program file that is in a form that can ultimately be run by the processor 803. Examples of executable programs may be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program may be stored in any portion or component of the memory 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803 may represent multiple processors 803 and/or multiple processor cores and the memory 806 may represent multiple memories 806 that operate in parallel processing circuits, respectively. In such a case, the local interface 809 may be an appropriate network that facilitates communication between any two of the multiple processors 803, between any processor 803 and any of the memories 806, or between any two of the memories 806, etc. The local interface 809 may comprise additional systems designed to coordinate this communication, including, for example, performing load balancing. The processor 803 may be of electrical or of some other available construction.

Although the live video source 215, the mixer 216, the plurality of video encoders 218, the interactive shopping interface application 221, the live video stream management application 224, the media server 227, the electronic commerce system 230, the advertising system 232, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4-7 show the functionality and operation of an implementation of portions of the interactive shopping interface application 221, the live video stream management application 224, the media server 227, and/or the content access application 263. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 803 in a computer system or other system. The machine code may be converted from the source code, etc. If embodied in hardware, each block may represent a circuit or a number of interconnected circuits to implement the specified logical function(s).

Although the flowcharts of FIGS. 4-7 show a specific order of execution, it is understood that the order of execution may differ from that which is depicted. For example, the order of execution of two or more blocks may be scrambled relative to the order shown. Also, two or more blocks shown in succession in FIGS. 4-7 may be executed concurrently or with partial concurrence. Further, in some embodiments, one or more of the blocks shown in FIGS. 4-7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the live video source 215, the mixer 216, the plurality of video encoders 218, the interactive shopping interface application 221, the live video stream management application 224, the media server 227, the advertising system 232, and the electronic commerce system 230, that comprises software or code can be embodied in any non-transitory computer-readable medium for use by or in connection with an instruction execution system such as, for example, a processor 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the live video source 215, the mixer 216, the plurality of video encoders 218, the interactive shopping interface application 221, the live video stream management application 224, the media server 227, the advertising system 232, and the electronic commerce system 230, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 800 or in multiple computing devices in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   a first computing device; and
   at least one application executable in the first computing device, wherein, when executed, the at least one application causes the first computing device to at least:
   render a user interface comprising the video stream via a display of the first computing device;
   receive data encoding a graphical overlay from the second computing device, the graphical overlay comprising a selectable component configured to facilitate performance of an interactive function associated with an item displayed via the video stream, the interactive function comprising at least one of: casting a vote relative to the item, requesting an item detail page, or a selection of a particular version of the item from a plurality of versions;
receive an indication of a graphical position of the item as displayed in the video stream from the second computing device, the graphical position being based at least in part on at least one coordinate of an approximate position of the particular item supplied by a third computing device;
render the graphical overlay over a portion of the video stream based at least in part on the graphical position of the item as displayed in the video stream;
identify a selection of the selectable component in the graphical overlay; and
initiate performance of the interactive function in response to the selection.

2. The system of claim 1, wherein, when executed, the at least one application causes the first computing device to at least receive user interface code from the second computing device, the user interface code being configured to implement the user interface for rendering the video stream.

3. The system of claim 1, wherein, when executed, the at least one application causes the first computing device to at least:
determine that the item is currently being discussed in the video stream.

4. The system of claim 3, wherein determining that the item is currently being discussed comprises receiving an indication from the third computing device.

5. The system of claim 3, wherein determining that the item is currently being discussed comprises receiving segment metadata from the second computing device, the segment metadata comprising a time-based association with the item and the video stream.

6. The system of claim 1, wherein the video stream depicts a host discussing a plurality of items.

7. The system of claim 1, wherein an area of the graphical overlay corresponds to a geometric shape to be superimposed over the graphical position of the item.

8. The system of claim 1, wherein the user interface further comprises a timeline user interface, the timeline user interface comprising a subset of items being discussed during a particular segment of the video stream, and when executed, the at least one application causes the first computing device to at least:
adjust a viewport of the timeline user interface to show a different portion of the timeline user interface corresponding to a different segment of the video stream.

9. The system of claim 8, wherein, when executed, the at least one application causes the first computing device to at least:
receive a user gesture relative to the timeline user interface, the user gesture comprising at least one of a scrolling gesture, a swiping gesture, or a selection gesture; and
wherein the viewport is adjusted in response to receiving the user gesture.

10. A method, comprising:
transmitting, via at least one first computing device, a video stream to a client, the video stream depicting a host discussing a plurality of items;
determining, via the at least one first computing device, a graphical position in a frame of the video stream at which a particular item of the plurality of items appears based at least in part on receiving at least one coordinate of an approximate position of the particular item from a second computing device;
generating, via the at least one first computing device, data encoding a graphical overlay configured to be rendered relative to the graphical position of the particular item, the graphical overlay being configured to be superimposed over the graphical position of the particular item in the video stream;
transmitting, via the at least one first computing device, the data encoding the graphical overlay to the client;
receiving, via the at least one first computing device, a selection of the graphical overlay, the selection comprising a request to perform an interactive function comprising at least one of: casting a vote relative to the particular item, requesting an item detail page, or facilitating a selection of a particular version of the particular item from a plurality of versions of the particular item; and
initiating, via the at least one first computing device, a performance of the interactive function.

11. The method of claim 10, further comprising:
generating, via the at least one first computing device, a timeline user interface, the timeline user interface comprising a display of a subset of the plurality of items, the subset of the plurality of items corresponding to individual items being discussed during a particular time of the video stream; and
transmitting, via the at least one first computing device, the timeline user interface to the client.

12. The method of claim 10, wherein the graphical overlay further comprises a rendering duration parameter of the video stream.

13. The method of claim 10, wherein a displayed version of the particular item is selected by default.

14. A non-transitory computer-readable medium embodying a program executable in at least one first computing device, wherein, when executed, the program causes the at least one first computing device to at least:
transmit a video stream to a client device;
identify a graphical position in a frame of the video stream at which an image of an item appears based at least in part on receiving at least one coordinate of an approximate position of the item from a second computing device;
generate data encoding a graphical overlay for rendering over the video stream according to the graphical position, an area of the graphical overlay corresponding to a geometric shape to be superimposed over the graphical position;
transmit the data encoding the graphical overlay to the client device;
receive a selection of the graphical overlay from the client device, the selection corresponding to a request to perform an interactive function relative to the item; and
cause the interactive function to be performed concurrently with a playback of the video stream, the interactive function comprising at least one of casting a vote relative to the item, requesting an item detail page, or facilitating a selection of a particular version of the item from a plurality of versions.

15. The non-transitory computer-readable medium of claim 14, wherein the video stream depicts a host discussing a plurality of items.

16. The non-transitory computer-readable medium of claim 15, wherein, when executed, the program further causes the at least one first computing device to at least transmit video segment information to the client device via a push arrangement, the video segment information comprising at least an order in which the plurality of items in a particular segment are discussed.

17. The non-transitory computer-readable medium of claim 14, wherein, when executed, the program further causes the at least one first computing device to at least transmit user interface code to the client device, the user interface code being configured to implement a user interface for rendering the video stream.

18. The non-transitory computer-readable medium of claim 17, wherein the program further causes the at least one first computing device to at least:
   identify another item associated with the item based at least in part on receiving user-submitted data from the client device; and
   generate data encoding another graphical overlay, the other graphical overlay corresponding to the other item and being configured to be rendered by the client device relative to the video stream.

19. The method of claim 10, wherein the second computing device is associated with a producer of the video stream, and wherein the at least one coordinate is received from the second computing device via a broadcaster management interface rendered on a display of the second computing device.

20. The method of claim 10, further comprising:
   generating, via the at least one first computing device, data indicating the plurality of items that are discussed during the video stream;
   transmitting, via the at least one first computing device, the data indicating the plurality of items that are discussed during the video stream.

* * * * *